United States Patent [19]
Cai et al.

[11] Patent Number: 5,995,535
[45] Date of Patent: Nov. 30, 1999

[54] RAPID TIME AND FREQUENCY ACQUISTION OF SPREAD SPECTRUM WAVEFORMS VIA AMBIGUITY TRANSFORM

[75] Inventors: Khiem V. Cai, Brea; Steven R. Severance, Yorba Linda, both of Calif.

[73] Assignee: Raytheon Company, Lexington, Mass.

[21] Appl. No.: 08/965,251

[22] Filed: Nov. 6, 1997

[51] Int. Cl.$^6$ .................................................. H04B 1/69
[52] U.S. Cl. ................................. 375/200; 375/354
[58] Field of Search ................................. 375/354, 200, 375/362, 367; 370/503, 515

[56] References Cited

U.S. PATENT DOCUMENTS

| | | | |
|---|---|---|---|
| 3,864,635 | 2/1975 | Ewanus | 455/260 |
| 4,653,076 | 3/1987 | Jerrim et al. | 375/367 |

Primary Examiner—Temesghen Ghebretinsae
Attorney, Agent, or Firm—Leonard A. Alkov; William C. Schubert; Glenn H. Lenzen, Jr.

[57] ABSTRACT

The present invention is a method of synchronizing a digital receiver to a digital transmitter in both frequency and time using a novel ambiguity transformation. The ambiguity transform combines time correlation and spectrum synchronization into an integrated two-dimensional transform process. The ambiguity transform includes the steps of multiplying a reference sequence with a received signal to create a product signal, calculating the magnitude of the spectrum of the product signal, and determining the peak product signal. Through multiple iterations of the ambiguity transform, and time and frequency shifts, a digital receiver may be synchronized to a digital transmitter. The method of the present invention may be implemented using a digital signal processor (DSP).

5 Claims, 2 Drawing Sheets t: time shift
c: frequency cell

RAPID TIME AND FREQUENCY ACQUISTION OF SPREAD SPECTRUM WAVEFORMS VIA AMBIGUITY TRANSFORM

BACKGROUND OF THE INVENTION (a) Field of the Invention

The present invention relates generally to digital communications and, more particularly, to a method and apparatus for rapidly synchronizing a digital receiver to a digital transmitter in both time and frequency.

(b) Description of Related Art

The reception of a digitally modulated signal requires that a receiver be synchronized with a transmitter. Two common modes of synchronization are by frequency and time. When a receiver attempts to obtain information sent by a transmitter, the receiver must be tuned to the frequency being transmitted. That is, the transmitter and the receiver must be synchronized in frequency. For a digital receiver to accurately demodulate the received signal, the receiver must know the starting time of the individual symbols that are received. This is referred to as time (or symbol) synchronization. Digitally transmitted information can only be interpreted when a transmitter and a receiver are synchronized in both time and frequency.

The importance of time and frequency synchronization in a digital transmission system can be readily appreciated. Although most academic discussion regarding the interaction of digital transmitters and receivers assume synchronization, actual implementation of a digital system requires the consideration of various methods of time and frequency synchronization. Many known synchronization methods employ the transmission of a known bit pattern or reference sequence from the transmitter to the receiver. In many cases a receiver also locally generates the same reference sequence that is transmitted by the transmitter. The comparison of the received reference sequence and the locally generated reference sequence provides the information necessary to synchronize the receiver to the transmitter in time. Synchronization may be done at the beginning of a transmission, or may be used periodically to ensure or re-establish synchronization.

A technique which is generally used for time synchronization is that of signal delay and correlation processing. A received signal, which contains a reference sequence, is fed to a tapped delay line, which is then correlated with a locally generated reference sequence via a summing bus. The received reference sequence is shifted relative to the locally generated bit sequence until, by way of correlation measurements, it is determined that the transmitted and locally generated sequences are time synchronized. This method is acceptable in applications where the frequency offset between the transmitter and the receiver is relatively small. However, in situations where frequency offsets between the transmitter and the receiver are large, the correlation of long sequences is subject to significant loss.

In situations where there exists a significant frequency offset between the transmitter and the receiver, another known synchronizing approach is to scan the receiver frequency in small steps through a frequency range suspected to contain a signal that is to be received. At each step in frequency a correlation operation is repeated. The process of changing receiver frequency and executing the correlation procedure is repeated until the transmitted signal is found. When the proper correlation is found both time and frequency are synchronized. This synchronization method is computationally inefficient and may be very time consuming if the frequency range to be stepped through is large. However, this method may be implemented in a hardware device such as an application specific integrated circuit (ASIC) dedicated to the function of synchronizing the receiver to the transmitter. Although the ASIC approach provides rapid synchronization, due to the fact that software calculations are avoided, it is not generally a cost effective solution.

Therefore, there exists a need for a rapid, scalable and computationally efficient method for synchronizing a digital receiver to a digital transmitter.

SUMMARY OF THE INVENTION

The present invention provides a method for rapidly synchronizing a digital received to a digital transmitter in both time and frequency. The method is computationally efficient and scalable for use with various communication frequencies. The present invention may be embodied in a method of synchronizing a digital receiver to a digital transmitter, including the steps of performing a transformation on a received signal and a locally generated signal; comparing the result of said transformation with a threshold; shifting said received signal until said result of said transformation exceeds said threshold; determining synchronization values for time and frequency synchronization; and using said synchronization values to synchronize said receiver to said transmitter.

The invention itself, together with further objects and attendant advantages, will best be understood by reference to the following detailed description, taken in conjunction with the accompanying drawings.

DESCRIPTION OF THE PREFERRED EMBODIMENTS

The reception of a digitally modulated signal requires that a receiver be synchronized with a transmitter. Two common modes of synchronization are by frequency and time. When a receiver attempts to obtain information sent by a transmitter, the receiver must be tuned to the frequency being transmitted. That is, the transmitter and the receiver must be synchronized in frequency. For a digital receiver to accurately demodulate the received signal, the receiver must know the starting time of the individual symbols that are received. This is referred to as time (or symbol) synchronization. Digitally transmitted information can only be interpreted when a transmitter and a receiver are synchronized in both time and frequency.

The present invention is a method of synchronizing a digital receiver to a digital transmitter in both frequency and time using a novel ambiguity transformation. The disclosed ambiguity transform combines time correlation and spectrum synchronization into an integrated two-dimensional transform process. The ambiguity transform includes the steps of multiplying a reference sequence with a received signal to create a product signal, calculating the magnitude of the spectrum of the product signal, and determining the peak amplitude of the product signal. Through multiple iterations of the ambiguity transform, and through time and frequency shifts, a digital receiver may be synchronized to a digital transmitter. The method of the present invention may be implemented using a digital signal processor (DSP). The advantage to using a DSP is that once synchronization is achieved, the DSP may be used to carry out other computational functions germane to the receiver. The method of the present invention is scalable and may be used in systems that have wide ranges of operating frequencies. Additionally, the method of the present invention is fast and computationally efficient.

Figure 1:
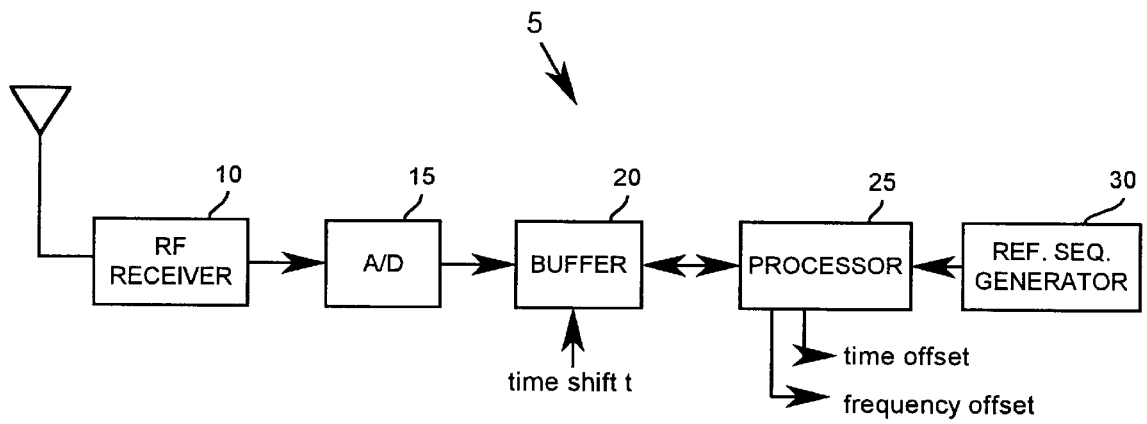
FIG. 1 is a block diagram illustrating a receiver system that may employ the present invention.

Referring now to FIG. 1, a digital receiver system 5 is shown. The receiver system 5 is capable of receiving digital transmissions from a transmitting station. As previously noted, it is commonly known in the art to transmit a reference sequence from the transmitter to the receiver system 5 for purposes of synchronization. The present invention employs the use of a reference sequence transmitted to the receiver station 5 and a reference sequence locally generated within the receiver station 5. The receiver station 5 includes an RF receiver 10 which, through known methods, receives a digitally modulated signal sent by a transmission station. The output of the RF receiver 10 is a form of the transmitted signal which may be offset in time and frequency as shown in equation (1).

$$s(t)=p(t-\tau)e^{j(2\pi\Delta f(t-\tau)+\phi)}+n(t) \qquad (1)$$

Wherein: s(t)=the output of the RF receiver 10;

p(t−τ)=a version of the transmitted signal delayed by time τ;

Δf=the frequency offset between the transmitter and the receiver;

φ=some phase offset of the received signal;

n(t)=noise introduced onto the information signal.

The signal received by the RF receiver 10 is digitally sampled by an analog-to-digital converter (A/D) 15. Suitable sampling processes are well known in the art. The samples of the received signal are stored in a data buffer 20. The buffer 20 may be any data storage device such as a memory or a shift register. Additionally, the buffer 20 may be integrated with another device such as a DSP. As the stored samples, which are representative of a time varying signal, are read out of the buffer 20, a time shift input to the buffer 20 may be used to advance or retard the timing at which the samples are read out of the buffer 20. A processor 25 is programmed to perform the function of the present invention. The output of the processor comprises time and frequency offsets for synchronizing a digital receiver to a digital transmitter. The processor 25 is coupled to the buffer 20 and to a reference sequence generator 30. The processor 25 may be embodied in any DSP. The selection of the DSP is application dependent and is relevant to the calculation speed required by the application. One example of a DSP that may be used is the Texas Instruments TI32000C40 digital signal processor. Note that this invention is not limited to this specific DSP, and various DSP products may be programmed to perform the function of this invention.

The reference sequence generator 30 performs the function of locally generating the reference sequence for the receiver. The reference sequence generator 30 may also be referred to as a pseudo-random noise generator. The object of the present invention is to synchronize the reference sequence generator located in the receiver with a reference sequence generator located in the transmitter.

Figure 2:
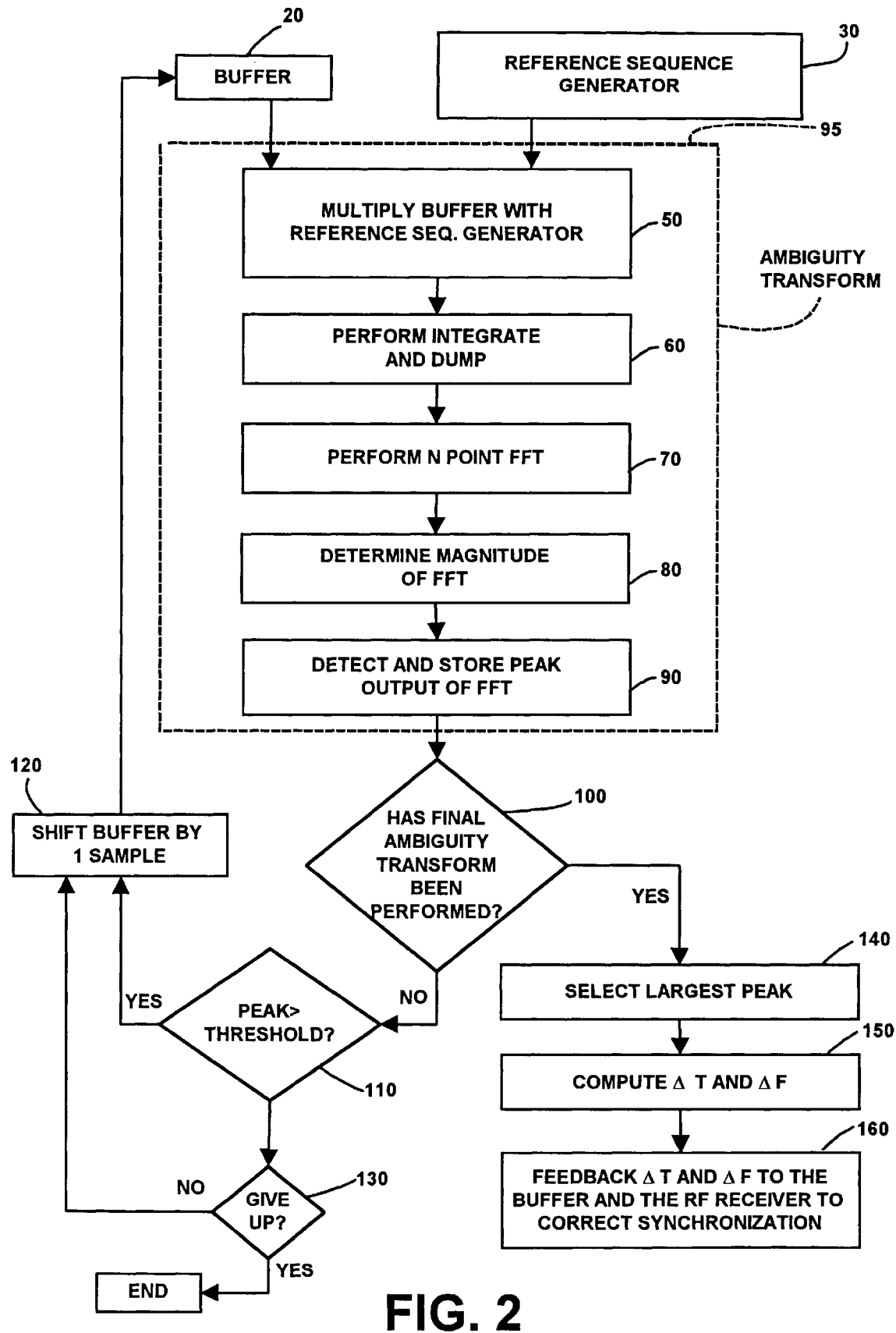
FIG. 2 is a flow diagram illustrating the method of the present invention.

FIG. 2 is a flow diagram of a method embodying the present invention. The functionality of the flow diagram is carried out by the processor 25 and associated hardware as noted. Block 50 performs the function of multiplying the contents of the buffer 20 with the output of the reference sequence generator 30. Note that a "digital high" is represented as a "1" and a "digital low" is represented as a "−1". The multiplication of the buffer 20 contents with the output of the reference sequence generator 30 may be represented by equations (2) and (3) below, wherein c(t) is the product of the buffer 20 and the reference sequence generator 30. Equation (2) represents the value of the product when there is a time offset (τ) and a frequency offset (Δ) between the reference signal and the received signal. Equation (3) represents the value of the product when there is only a frequency offset (Δ) between the buffer 20 and the reference sequence generator 30 output. The multiplication of two digital signals is a measure of the correlation of the two signals. That is, if at a given time the signals are in the same state, the result of the multiplication is a digital "1." If the multiplied signals are not in the same state, the result is a digital "−1," Therefore, the more often (in time) the product of two signals is a digital "1," the higher the correlation of the two signals.

$$c(t)=r(t)p(t-\tau)e^{j(2\pi\Delta f(t-\tau)+\phi)}+n(t) \qquad (2)$$

$$c(t)=r(t)p(t)e^{j(2\pi\Delta ft+\phi)}+n(t) \qquad (3)$$

Note that the product of r(t) and p(t) is a continuous digital "1" when there is no time offset between the buffered signal and the reference signal.

A block 60 performs the integrate and dump function, which is used to decimate a signal sampling rate and cover the range of frequency offsets that are expected. A block 70 performs an "N point FFT" on the results of the integrate and dump function. As is well known in the art, the N point FFT generates results that indicate the frequency spectral content of the input signal. As shown in equation (3), if the receiver and the transmitter are synchronized in time, the only remaining component of the signal is the exponential continuous wave component dependent on Δf (i.e., the frequency difference between the transmitter and the receiver). Therefore, if the signals are time synchronized, the result of the N point FFT is a frequency peak at a frequency of Δf. If time synchronization has not been achieved, the results of the N point FFT will not yield a distinct peak in the frequency spectrum. Rather, the results from the FFT will have spectral characteristics similar to noise.

A block 80 performs the function of determining the magnitude of the FFT components, while a block 90 detects and stores the peak components of the FFT output. Storing the peaks of the FFT output is important to achieving synchronization between the transmitter and the receiver. It should be noted that the functions of blocks 50 to 90, together as described, perform the function of the ambiguity transform 95.

A block 100 determines whether or not a final ambiguity transform has been performed. After the output of the ambiguity transform exceeds a threshold, the ambiguity transform is repeated a final time. The ambiguity transform performed after the threshold is exceeded is referred to as the final ambiguity transform. The functionality of block 100 may be carried out by setting a software flag to track whether an ambiguity transform has been completed after the output of the ambiguity transform has exceeded the threshold. If the final ambiguity transform has not been completed, program control is passed to a block 110.

Block 110 performs the function of comparing the maximum peak of the FFT result to a threshold. The threshold is set such that if the transmitter and the receiver are not in time synchronization the peak output of the FFT will be below the threshold. If it is the case that the threshold is exceeded, a block 120 performs the function of shifting the buffer 20 forward by one sample and restarting the ambiguity transform 95. The buffer 20 is shifted by one sample in an effort to time synchronize the receiver to the transmitter. That is, shifting the buffer 20 is an attempt to achieve time synchronization, which will generate a peak in the FFT output sufficient to exceed the threshold used for comparison in block 110. If block 110 determines that the peak does not exceed the threshold, control is passed to a block 130. Block 130 determines if the process should end based on the peak of the FFT not exceeding the threshold. The decision to end the process may be dependent on the number of buffer shifts made without the FFT output exceeding the threshold. Repetitive buffer shifts without exceeding the threshold indicates an absent or weak received signal. If block 130 does not end the process, control is passes to block 120.

Figure 3:
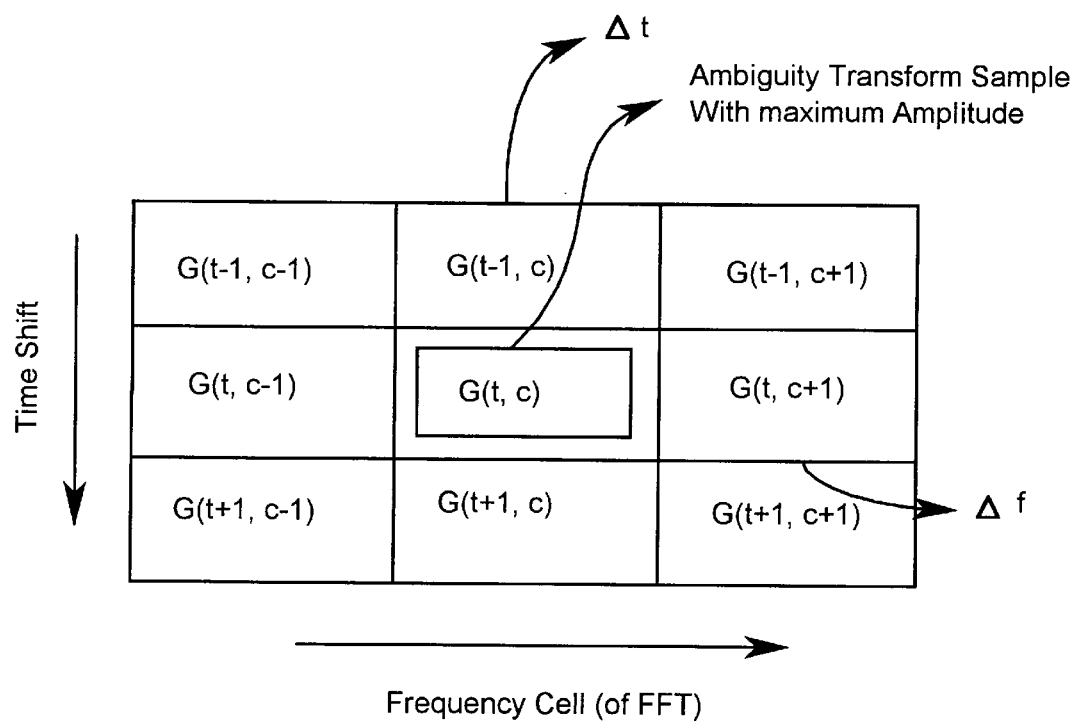
FIG. 3 is a graphical representation of data stored using the method of the present invention.

If the final ambiguity transform has been performed, block 100 passes control to a block 140. After the completion of the final ambiguity transform block 140 performs the function of selecting the largest peak that was output by the FFT function. The purpose of incrementing the buffer 20 and repeating the ambiguity transform after the peak exceeds the threshold is to find an FFT peak on the other side of the largest FFT peak. This is analogous to climbing a mountain. As the buffer 20 is shifted the FFT peak comes nearer and nearer to the threshold (climbing toward the summit of the mountain). After the FFT peak exceeds the threshold (reaching the summit of the mountain), one more shift is made to determine the largest FFT level on the other side of the peak (descending down the back of the mountain from the summit). This information is conveniently represented as shown in FIG. 3, wherein, the center cell G(t,c) is representative of synchronization in time (t) and frequency (c) (i.e., the largest FFT output peak). The x-axis of FIG. 3 represents frequency differences between the transmitter and the receiver. Cells to the right of the center cell represent a positive frequency offset (c+1), whereas the cells to the left of the center cell represent a negative frequency offset (c−1). The y-axis represents time offset between the transmitter and the receiver. The cells above the center cell represent a negative time offset (t−1) and the cells below the center cell represent a positive time offset (t+1). The time and frequency FFT peak information is acquired and stored as the ambiguity transforms are executed. The time offset is found by counting the number of shifts that were necessary to make the FFT peak exceed the threshold, and the frequency offset is found by storing the frequency at which the peaks in FFT output were located. The information which is compiled and symbolically represented in FIG. 3 is used by block 150 to calculate the time and frequency offsets which need to be made by block 160 to the buffer and the RF receiver, respectively.

Therefore, it can be seen from the preceding detailed description that the disclosed invention achieves several advantages. Specifically, the present invention is fast and computationally efficient in comparison to traditional synchronization methods. Because the method of the present invention is preferably implemented on a DSP, once synchronization is achieved, the DSP may be used to carry out other computational functions required by the receiver. The present invention is also scalable and may be used in systems having wide operating frequency ranges.

Of course, it should be understood that a range of changes and modifications can be made to the preferred embodiment described above. For example, the Discrete Fourier Transform or a bank of digital filters that span the frequency band of interest may be used in place of the Fast Fourier Transform. In cases where the region of frequency of uncertainty does not span a broad spectrum, the calculation of the frequency spectrum may be restricted to include only the restricted band. This allows the computation of only the necessary points of interest, thereby reducing computation load and processing time. In cases where time uncertainty is reduced, time shifts performed by the algorithm may be limited.

It is therefore intended that the foregoing detailed description be regarded as illustrative rather than limiting and that it be understood that it is the following claims, including all equivalents, which are intended to define the scope of this invention.

What is claimed is:

1. A method of synchronizing a digital receiver to a digital transmitter, comprising the steps of:

performing an ambiguity transformation on a received signal and a locally generated signal;

comparing a result of said ambiguity transformation with a threshold;

shifting said received signal until said result of said ambiguity transformation exceeds said threshold;

determining synchronization values for time and frequency synchronization; and using said synchronization values to synchronize said receiver to said transmitter;

wherein said ambiguity transformation comprises the steps of:

multiplying said received signal with said locally generated reference signal to produce a product signal;

performing an integrate and dump function on said product signal to produce a decimated signal;

converting said decimated signal to a frequency domain signal;

determining magnitude values of said frequency domain signal; and determining a peak magnitude from said magnitude values.

2. The method of claim 1 wherein said step of converting said decimated signal to a frequency domain signal comprises the calculation of an N point Fast Fourier Transform.

3. The method of claim 1 wherein said threshold is determined by a desired correlation between said received signal and said locally generated signal.

4. The method of claim 1 wherein said synchronization values pertain to time and frequency offsets.

5. The method of claim 1 wherein said locally generated signal may be generated by a pseudo-random noise generator.

* * * * *